Nov. 19, 1968    G. F. McGOWAN    3,411,184
SPRING-ACTION DENTAL COMPRESS
Filed Sept. 1, 1966
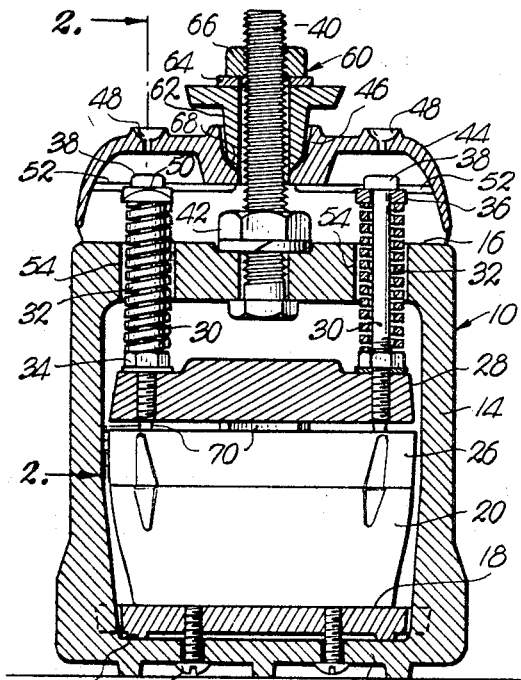
INVENTOR
George F. McGowan
BY Hovey, Schmidt, Johnson & Hovey
ATTORNEYS

United States Patent Office 3,411,184
Patented Nov. 19, 1968

3,411,184
SPRING-ACTION DENTAL COMPRESS
George F. McGowan, 4509 Forest Ave.,
Kansas City, Mo. 64110
Filed Sept. 1, 1966, Ser. No. 576,722
9 Claims. (Cl. 18—33)

This invention relates to to a dental compress which utilizes equalized spring action to hold the denture-containing flask during curing.

Dental flasks of the type, for example, shown in my United States Letters Patents Nos. 2,899,707 and 2,975,479 are employed in the manufacture of dental appliances to contain the denture and an investment material during uniting of the artificial teeth and the plastic plate portion of the denture by the application of heat. Since the steps of the various techniques of prosthetic dentistry are well known to those skilled in the art and are outlined in the aforesaid patents, such techniques will not be discussed in detail herein.

A handpress is commonly employed to close the flask prior to curing. During the curing process, a curing clamp is utilized to hold the sections of the flask together as the same are subjected to the heat of a curing vat. As discussed in my copending application, Ser. No. 468,790, filed July 1, 1965, now Patent No. 3,267,525, and entitled, "Combination Handpress and Curing Clamp," problems are encountered with the finished denture product if closing of the flask and subsequent clamping during curing thereof is improperly effected. In particular, an open bite configuration may be imparted to the finished denture if evenly distributed forces are not produced by the press and curing clamp utilized. The aforesaid application is directed to the provision of a handpress and curing clamp of novel design which precludes the formation of an open bite denture.

Although the press and clamp structure disclosed in the aforesaid application has proven to be highly satisfactory, it is desirable, if possible, to utilize a spring action compress in the curing of dentures since the heat of the curing vat necessarily causes expansion of the various metal parts of the flask and the clamp. The basic concept of a spring compress is well known in the art and has the advantage of compensating for the expansion produced by heat due to the use of springs to apply the holding force to the flask. However, such prior art spring compresses also have a major disadvantage in that no means is provided to assure that the force applied by each spring will be of the same magnitude.

It is, therefore, the primary object of this invention to provide a spring action dental compress in which the force applied by the springs is automatically equalized, regardless of any variations which might exist in the relative strengths of the springs.

As a corollary to the foregoing object, it is an important aim of this invention to provide such a compress having a single adjustment through which force is applied to the springs thereof, rather than independently adjustable springs as utilized heretofore. With independently adjustable springs, force unbalance inherently occurs due to ultimate deterioration of the springs by crystallization or rust rot, which will rapidly occur since the springs are constantly subjected to boiling water and steam in the curing process.

Further, it is a specific object of this invention to provide a compress wherein a pair of springs are utilized to transmit force to a flask-engaging pressure plate, the springs being compressed by the tightening of a head thereupon which spans the upper ends of the springs and is forcibly advanced toward the pressure plate by the application of force acting along a line equidistant and parallel with the axes of the springs and centered with respect to the pressure plate.

Additionally, it is an object of the instant invention to provide a spring action compress as aforesaid which may also be utilized as a center screw handpress for closing the flask prior to curing.

In the drawing:

FIGURE 1 is a sectional view taken in a vertical plane through the frame of the compress, the flask and certain parts of the compress being revealed in elevation for clarity;

FIG. 2 is a vertical sectional view taken along line 2—2 of FIG. 1;

FIG. 3 is a fragmentary view similar to FIG. 1 showing a modification of the FIG. 1 structure which enables the compress to also serve as a center screw handpress;

FIG. 4 is a perspective view showing the underside of the pressure plate; and

FIG. 5 is a perspective view of a dual purpose holder for use with the compress or a flask alone.

A closed, rectangular frame 10 includes a bed 12 of generally circular configuration as viewed in a horizontal plane, a pair of spaced, parallel standards 14 integral with bed 12, and a beam 16 interconnecting the upper ends of standards 14. A leveling plate 18 forms a base upon which the lower section 20 of a two-section dental flask rests, leveling plate 18 being provided with four footings 22 which engage the upper surface of bed 12 and impart stability to the leveling plate. A pair of threaded fasteners 24 extend upwardly through bed 12 and are threaded into plate 18 to hold the latter securely in place on the bed.

The upper section of the dental flask is designated 26, the two sections 20 and 26 being held together under clamping force applied to the upper surface of section 26 by a pressure plate 28. A pair of bolts 30 are threaded into tapped openings in plate 28 adjacent opposed edges thereof and form a pair of upright guides for two coil springs 32. Each bolt 30 is rigidly secured to plate 28 by a nut and washer assembly 34, the corresponding coil spring 32 being telescoped over the upright guide portion of the bolt and held in slight compression between assembly 34 and a component 36 which is slipped over the bolt during assembly and directly underlies bolt head 38.

In FIGS. 1 and 2, a threaded member 40 in the form of an inverted bolt extends through a central aperture in beam 16 and is fixed to the beam by a nut 42 and associated washer. An elongated, force-applying head 44 is of one-piece, cast construction and has the appearance of a cap or housing and is provided with a central opening 46 which permits head 44 to be slipped over member 40. FIG. 2 reveals that head 44 is of generally inverted, U-shaped configuration as viewed in cross section. A pair of oil holes 48 are provided in the top of head 44 in alignment with respective springs 32, a suitable lubricant being employed to reduce the speed of deterioration of the springs under the affects of steam and boiling water during the curing process.

Each component 36 is in the form of a washer or spacer provided with a pair of opposed, laterally extending, upwardly convex shoulders 50. Head 44 has a pair of internal, parallel, depending ribs 52 extending horizontally from each side of opening 46, each pair of ribs 52 being in overlying engagement with the rounded shoulders 50 of the corresponding component 36. Thus, it will be appreciated that head 44 spans the spaced springs 32 and, by virtue of the two pairs of internal ribs 52, rests upon components 36 in overlying engagement with the four shoulders 50.

Beam 16 has a pair of vertically extending clearance openings 54 therethrough for respective springs 32, the latter being of sufficient length to support cap 44 above the beam a sufficient distance to prevent interengagement of the bottom margins of the opposed sides 56 of the head, and a pair of underlying, horizontal ledges 58 formed in beam 16. Sides 56 are drawn toward ledges 58 by the action of a tightening assembly 60 which includes a winged collar 62 and a washer 64 slipped over the upper end of member 40, and a nut 66 threaded thereon. It should be noted that the lower end of collar 62 is rounded to complementally engage a socket 68 formed in the internal surface of central opening 46.

The modified form of the invention shown in FIG. 3 is identical to the embodiment of FIGS. 1 and 2 with the exception of the structure utilized to forcibly shift head 44 downwardly to compress springs 32. In the modification of FIG. 3, a center screw member 100 is threadably received by a vertical, tapped opening in the central portion of beam 16, permitting screw member 100 to be advanced downwardly until its lowermost, rounded tip 102 engages a recess 104 in the upper surface of the central portion of pressure plate 28.

A tightening assembly 106 includes a collar 108 and an overlying washer 110 slipped over member 100, a threaded spacer 112 having opposed wings and a nut 114 threaded on member 100 and overlying spacer 112. The structure of FIG. 3 may be operated as a center screw handpress by rotating nut 114 and spacer 112 away from washer 110 and collar 108 until a sufficient space exists to permit member 100 to be threaded downwardly through beam 16 into engagement with pressure plate 28. Wrench flats 116 are provided on the head of member 100 for this purpose. When utilized as a spring compress, member 100 is backed away from pressure plate 28 to a position as illustrated in FIG. 3, and spacer 112 and nut 114 are moved down into engagement with the other parts of assembly 106, as shown.

FIGURE 1 illustrates that pressure plate 28 is provided with four depending feet 70 spaced around the underside of the plate at the edges thereof. Thus, the clamping force of the compress is applied to the flask at the periphery thereof in alignment with the flask sidewalls, as in my aforesaid copending application.

FIGURE 5 illustrates a convenient means of handling the compress when the same becomes heated to elevated temperatures during the curing process A holder 72 is shown having a pair of legs 74 interconnected by a bottom plate 76, the latter having a double keyhole slot 78 therein. A handle 80 of wood or other nonconductive material spans legs 74 remote from plate 76. In use, slot 78 is slipped over member 40 of the embodiment of FIGS. 1 and 2, or member 100 of the embodiment of FIG. 3, until the wings of collar 62 or spacer 112 clear plate 76. Holder 72 is then rotated, whereupon it may then be utilized to carry the compress from place-to-place since the wings will overlie plate 76 and lock the holder and the compress together.

Additionally, holder 72 serves as a means of holding and containing a dental flask when the latter is placed in boiling water to boil out the wax model within the investment. The flask is placed on bottom plate 76 and lowered into the water, the handle 80 remaining above the water level to permit the flask to be readily removed in a heated condition.

In the operation of the embodiment of FIGS. 1 and 2, the compress is placed in a suitable bench mount assembly such as shown and described in my aforesaid copending application. After the flask has been closed and packed (which may be effected by a center screw handpress), the flask is placed on leveling plate 18 in the position shown with feet 70 of the pressure plate in overlying engagement with upper section 26. Nut 66 is then tightened by a wrench to clamp the flask between the feet 70 of the pressure plate and leveling plate 18. As nut 66 is tightened, head 44 is forced downwardly, thereby causing the four ribs 52 to forcibly engage respective convex shoulders 50 of components 36. Thus, the head is lowered with respect to bolt heads 38, causing springs 32 to compress to thereby clamp the flask between the pressure and leveling plates by spring action. It is to be understood that nut 66 is shown fingertight against washer 64 prior to the application of sufficient force to the nut to compress the springs.

It should be noted that the longitudinal axis of member 40 is disposed between coil springs 32 and is located in parallelism with the axes of the springs and in equally spaced relationship therefrom. Additionally, member 40 is aligned with the central portion of pressure plate 28, springs 32 being equally spaced from the center of the pressure plate. Thus, it is assured that equal forces will be applied to the two springs, even in the event that the two springs are of unequal strength. Should one spring become weak due to deterioration, for example, head 44 will compensate by tilting slightly to effect greater compression of the weaker spring. This is assured without binding friction by virtue of the rounded shoulders 50 upon which ribs 52 of the head rest. Should one spring become so weak as to be unusable, this will be readily detected by the operator since the lower margins of sides 56 adjacent one end of the head will be brought into engagement with ledges 58 as nut 66 is tightened.

It will be appreciated that the modified form of the invention shown in FIG. 3 operates in an analogous fashion when the parts of tightening assembly 106 are in the positions illustrated. The modified compress is shown prior to the application of force to the springs, compression of springs 32 being effected by applying a wrench to flats 116 to advance the head downwardly. The advantage of the FIG. 3 arrangement lies in the fact that the modified compress may also be employed as a center screw handpress to close and pack the flask prior to utilizing the compress as a spring action curing clamp.

Having thus described the invention, what is claimed as new and desired to be secured by Letters Patent is:

1. A compress for a sectional dental flask comprising:
   a base;
   a beam spaced from said base, the latter being adapted to support said flask between the base and the beam;
   means interconnecting said base and said beam;
   a pressure plate between said base and said beam; and
   pressure means mounted on the beam and coupled with said plate for forcing the plate against the flask when the latter is on the base,
   said pressure means including a pair of spaced, yieldable, force transmitting elements extending from the plate away from said base, and struture engageable with said elements for simultaneously applying eqaul forces thereto directed toward said plate, whereby to place said elements in compression as the flask is clamped between the plate and the base.

2. The invention of claim 1,
   said plate having a central portion,
   said elements being secured to said plate substantially equidistant from said portion and adjacent opposed edges of the plate,
   said plate being provided with means thereon spaced outwardly from said portion for applying said forces to the flask exclusively at the periphery of the flask when the latter is clamped between the plate and the base.

3. The invention of claim 1,
   said structure including a force-applying head spanning said elements, and means engageable with said head at a zone thereof centered with respect to the lines of action of said equal forces for shifting the head toward said plate.

4. The invention of claim 1,
   said structure including a force-applying head spanning said elements and having an opening therein centered with respect to the lines of action of said equal forces, and a device for shifting the head toward said plate comprising a threaded member carried by said beam and extending through said opening, and tightening means threaded on said member and engageable with said head.

5. The invention of claim 4,
said member being rigid with said beam.

6. The invention of claim 4,
said member being elongated and rotatable about its axis toward and away from a disposition engaging said plate, and being provided with means adapted for engagement by an operating tool to advance the member in either direction whereby, when the tightening means is out of forcible engagement with the head, advancement of the member into engagement with the plate and continued application of force thereto clamps the flask between the plate and the base by a screw press action.

7. The invention of claim 1,
each of said elements comprising a coil spring,
said structure including a force-applying head spanning said springs, means engageable with said head at a zone thereof between said springs for shifting the head toward said plate, and a pair of components spaced from said plate and engaging respective springs,
said components presenting shoulders supporting said head with the latter resting thereon whereby, as the head is shifted toward the plate, the springs are compressed by forcible engagement of the head with said shoulders.

8. The invention of claim 7,
said head having an opening therein centered with respect to said springs and presenting a socket,
said head-shifting means including a threaded member carried by said beam and extending through said opening, a collar telescoped over said member and complementally received by said socket, and nut means threaded on the member and holding the collar and the socket in interengagement during compressing of the springs.

9. The invention of claim 1,
each of said elements comprising an elongated, upright coil spring having an upper end remote from the plate,
said structure including a force-applying head spanning said springs, means engageable with said head at a zone thereof between said springs for shifting the head toward said plate, and a pair of components in overlying engagement with the upper ends of respective springs,
each of said components presenting a pair of upwardly convex shoulders on opposite sides of the longitudinal axis of the corresponding spring,
said shoulders supporting said head with the latter resting exclusively thereon.

References Cited
UNITED STATES PATENTS

| 731,030 | 6/1903 | Finn | 18—32 XR |
| 2,858,568 | 11/1958 | Myerson | 18—33 |
| 3,058,155 | 10/1962 | Harris | 18—33 |
| 3,267,525 | 8/1966 | McGowan | 18—33 |

FOREIGN PATENTS 607,475   8/1948   Great Britain.

J. HOWARD FLINT, JR., *Primary Examiner.*